United States Patent Office 3,319,734
Patented May 16, 1967

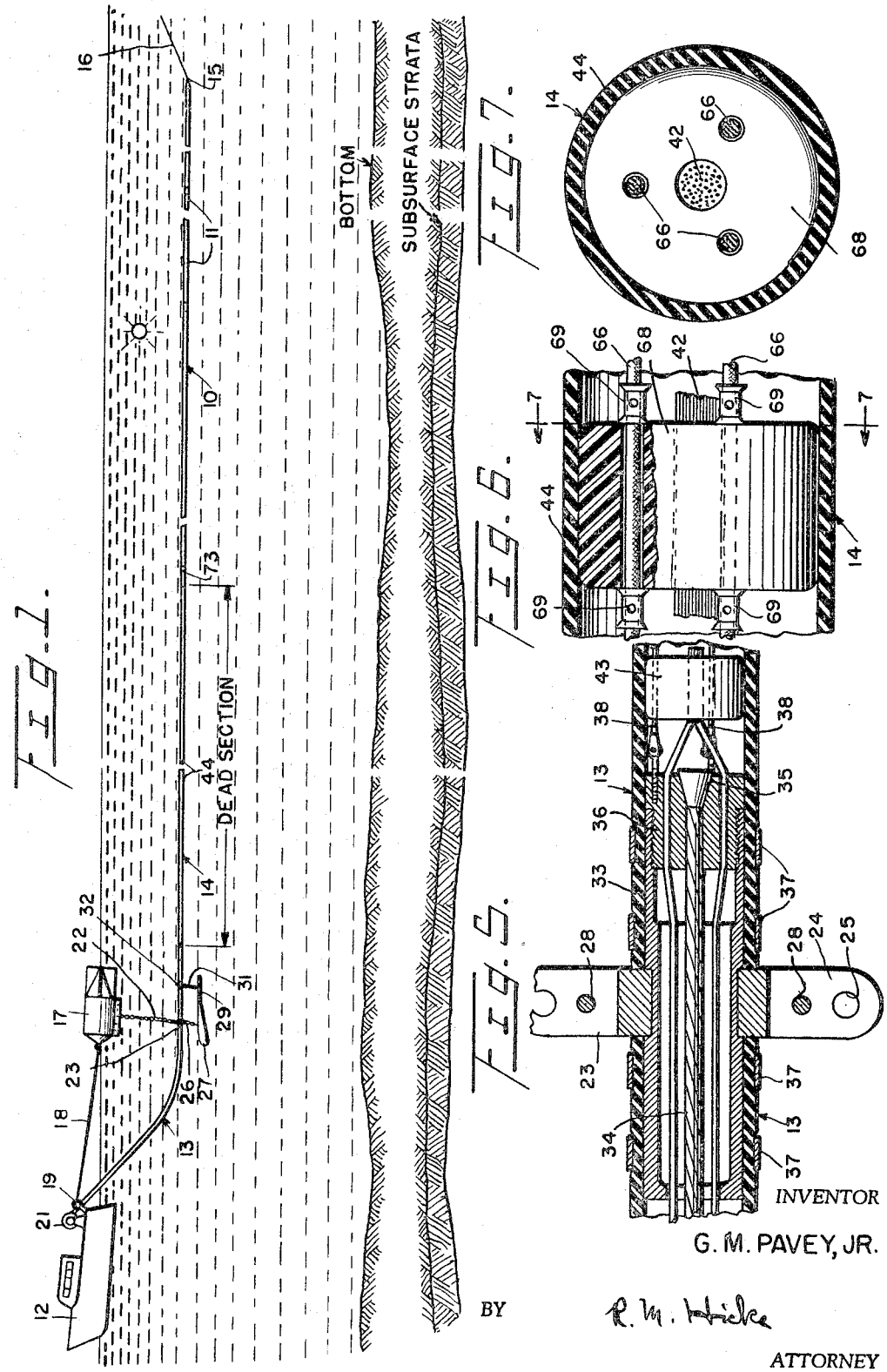

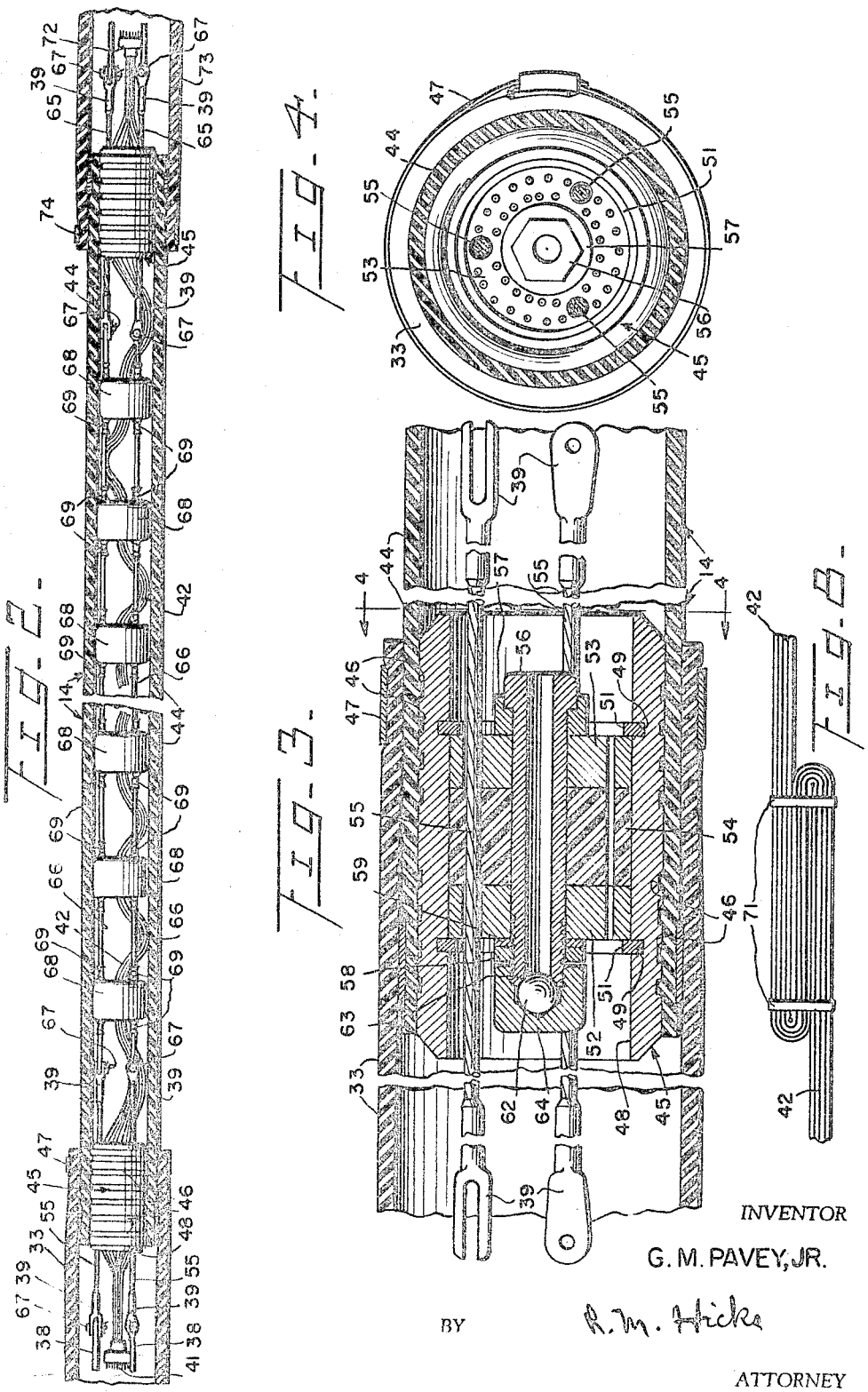

3,319,734
ELASTIC DETECTION STREAMER DEAD SECTION FOR A WATER BORNE SEISMIC SURVEYING SYSTEM
George M. Pavey, Jr., Dallas, Tex., assignor to Whitehall Electronics Corporation, Richardson, Tex.
Filed June 17, 1965, Ser. No. 464,739
9 Claims. (Cl. 181—.5)

ABSTRACT OF THE DISCLOSURE

An elastic oil filled dead section streamer having a plurality of plastic strain cables therein connectable to a tow line from a vessel and the forward end of a submerged seismic detection streamer containing sensing means for transmitting seismic signals to receiving apparatus on the vessel corresponding to seismic impulses detected thereby. A plurality of loosely arranged conductors within the dead section streamer establish electrical communication between the detecting devices and the receiving apparatus. The dead section streamer prevents vibrations from the tow cable from adversely affecting the seismic detecting devices when the streamer is towed at high speed.

---

This invention relates to a waterborne system for making a seismic survey of underwater deposits of oil and more particularly to a system for surveying subaqueous geological formations and exploring oil-retaining subsurface terrestrial structures by employing seismic signals received by a plurality of detecting devices disposed within an elongated flexible streamer towed by a vessel continuously at a uniform relatively high rate of speed beneath the surface of a body of water as the explosive shot is fired in which means are provided for preventing acoustic pickup of extraneous signals by the detecting devices caused by vibration of the lead-in from the streamer to the vessel.

In prior modern systems of this character heretofore devised such, for example, as the system disclosed and claimed in Patent No. 2,729,300 for Water Borne Means for Making Seismic Surveys, issued Jan. 3, 1956 to LeRoy C. Paslay et al., it has been the usual practice to receive the seismic signals by a plurality of pressure responsive detectors disposed within a streamer and towed through the water by a vessel. In such systems, however, it has been found necessary to reduce the towing force applied to the streamer and thereby reduce the rate of speed of the streamer through the water when seismic signals are received. This relaxation of the towing force has been found necessary to prevent the detectors within the streamer from being adversely affected by noise resulting from the vibration of the lead-in or tow cable. Such a system possesses the disadvantage of slowing down the seismic survey operation and increasing the wear and tear on the lead-in cable as a result of paying out an additional length thereof each time the shot is fired and thereafter reeling in the additional length payed out in preparation for the next shot.

The system of the present invention allows a simpler cable reel to be employed which does not require the services of a reel operator each time the seismic shots are fired in successive order and, in addition, greatly increases the rapidity of effecting seismic survey of a predetermined subaqueous area.

The system of the present invention possesses all the advantages of the prior systems and none of the foregoing disadvantages of such prior systems. In accordance with the arrangement of the present invention, the vibrations from the lead-in cable, while the detection cable is towed thereby at a continuously uniform relatively high rate of speed, are absorbed by an elongated flexible mechanical vibration attenuator interposed between the front or leading end of the detection streamer and the trailing end of the lead-in cable and connected respectively thereto.

In accordance with the teaching of the present invention this vibration attenuator takes the form of a length of an oil filled flexible elastic tube or hose generally similar externally to the detection streamer tubing through which the signal wires extend in a slackened condition for establishing a plurality of electrical connections from the head end of the detection streamer to the signal conductors within the lead-in cable. This vibration attenuator is not provided with hydrophones or other type of seismic signal detecting devices and is referred to herein as an elastic streamer dead section or noise attenuator. A plurality of strain cables composed preferably of a material known in the trade as nylon extend interiorly throughout substantially the length of the dead section for establishing an elastic towing connection between the lead-in tow cable and the detection streamer, as will be more clearly apparent as the description proceeds.

One of the objects of the present invention is to provide a new and improved seismic surveying system in which the seismic signals are detected by a plurality of seismic sensing devices disposed within an elongated submerged flexible detection streamer while being towed continuously at a uniform relatively high rate of speed through the water by a moving vessel.

Another of the objects is to provide new and improved means for towing a seismic signal detecting device in a submerged condition through the water continuously at a uniform relatively high rate of speed from a moving vessel and for effecting attenuation of the vibrations from the lead-in towing cable sufficiently to prevent the vibrations from adversely affecting the signal detecting device while the device is being towed at a relatively high rate of speed.

Still another object is the provision of a new and improved elastic dead section for effecting a towing connection between an elongated flexible detection streamer and a lead-in cable in which vibrations from the lead-in cable are prevented from adversely affecting the operation of a plurality of seismic sensing devices disposed within the detection streamer while the streamer is being towed continuously in a submerged condition within the water by a moving vessel at a uniform relatively high rate of speed.

Still another object is the provision of a new and improved mechanical vibration attenuator for establishing a towing connection between an elongated flexible detection streamer and a lead-in towing cable whereby the streamer may be towed continuously in a submerged condition at a uniform relatively high rate of speed by a moving vessel while seismic signals are being received without being adversely affected by vibrations from the lead-in tow cable.

Still another object is the provision of a new and improved vibration attenuator for a seismic surveying system which is economical to manufacture, reliable in operation, durable in service and which possesses all the advantages of ruggedness and high efficiency for the purpose intended.

Still other objects, advantages and improvements will be apparent from the following description, taken in connection with the accompanying drawings, of which:

FIG. 1 is a diagrammatic view of the system of the present invention in accordance with a preferred embodiment thereof;

FIG. 2 is a sectional view partially broken away of the mechanical vibration attenuator dead section of FIG. 1 with coupling hoses attached thereto;

FIG. 3 is an enlarged sectional view partially broken away of an end portion of the dead section of FIG. 2 with a coupling hose secured thereto and the signal wires removed therefrom;

FIG. 4 is a view taken along the line 4—4 of FIG. 3;

FIG. 5 is a fragmentary view in section of the trailing end portion of the lead-in tow cable illustrating the connection of the strain cables thereto;

FIG. 6 is an enlarged sectional view of one of the spacers of the dead section of FIG. 2;

FIG. 7 is an end view taken along the line 7—7 of FIG. 6, and

FIG. 8 is a view of a short length of the signal wires within the dead section streamer in an initially folded condition.

Referring now to the drawings on which like numerals of reference are employed to designate like parts throughout the several views for a more complete understanding of the invention, and more particularly to FIG. 1 thereof, there is shown thereon in diagrammatic form a preferred embodiment of the system of the present invention, the system comprising a detection streamer indicated generally by the reference numeral 10 and composed of a plurality of oil filled sections 11, towed at a uniform relatively high rate of speed by a vessel 12, in a submerged condition within the water. The streamer is provided with a lead-in or tow cable generally indicated by the numeral 13 employed for establishing a towing connection to the vessel. The trailing end of the tow cable is secured to the leading end of a neutrally buoyant mechanical noise attenuator or elastic dead section generally indicated at 14, the other end of the dead section being secured to the leading end of the foremost section 11 of the detection streamer 10 as will be more clearly apparent as the description proceeds.

The rearmost section of the detection streamer is preferably provided with an eye-bolt 15 or the like, to which a line 16 is preferably secured for establishing a towing connection to a float or marker (not shown) whereby the position of the trailing end of the detection streamer within the water may be observed, if desired.

There is also provided a float 17 towed by a length of line 18 secured to the vessel at one end thereof as at 19. A reel 21 is also provided on the vessel for paying out the detection streamer, the dead section, and a predetermined length of lead-in cable in the order named.

A chain or length of line 22 preferably of stainless steel connects the float 17 to a collar 23 within which is disposed the trailing end portion of the tow cable 13 as most clearly shown on FIG. 5. The collar is provided with a downwardly projecting member 24 having an aperture 25 therein for effecting a connection to bridle 26 to support a heavy depressor 27 within the water. The collar 23 is preferably of two piece construction to facilitate attachment to the tow cable 13, the parts being held together as by bolts, rivets or the like disposed within bores 28.

An arrangement is thus provided whereby the leading or head end of the dead section of the streamer is towed at a predetermined depth controlled by the length of the chain 22. The depressor is provided with a trailing end portion 29 suspended by a line or chain 31 secured at one end thereof to a collar 32 encircling the tow cable 13.

Referring now specifically to FIG. 5 the tow cable comprises a length of flexible tubing such as a gasoline hose 33 within which is disposed a strain cable 34 having the trailing end enlarged as at 35 for engagement with a complementary socket formed within a spider 36 composed of metal suitable for the purpose such, for example, as zinc, aluminum, stainless steel or the like to which the tubing 33 is tightly clamped as by the clamps 37.

There is secured to the spider 36, as by the eye bolts illustrated, three equally spaced strain cables 38 composed of metal suitable for the purpose, such, for example, as steel and of sufficient length to extend somewhat beyond the trailing end of the tow cable, each of the strain cables terminating in an eye member secured thereto suitable for connection to the clevis member 39 clearly shown on FIGS. 2–3. The signal conductors within the tow cable also extend beyond the trailing end thereof and terminate preferably in two or more multicontact jacks (not shown) for connection with complementary plug members 41 of the dead section streamer thereby to establish a plurality of external electrical connections to the signal conductors 42 extending throughout the length of the dead section.

The trailing end of the tow cable is clamped to the apertured adaptor or spider 36 disposed therein through which the signal conductors and strain cables 38 are arranged for effecting a watertight connection therebetween. A plurality of spacing elements 43 are arranged at intervals along the tow line, FIG. 5, to maintain the strain cables and signal conductors in proper spaced relation. Since the lead-in or tow cable, per se, forms no part of the present invention, a further description thereof is deemed unnecessary.

Referring now particularly to FIG. 2 in which is shown in greater detail the elastic dead section or mechanical vibration attenuator 14 according to a preferred embodiment thereof, the device comprises a length of flexible tubing 44 composed of a plastic material suitable for the purpose such as polyvinyl chloride and having the ends sealed to retain a quantity of oil therein.

On FIG. 3 is shown a view somewhat in section and partially broken away of the head end of the dead or vibration attenuating section of the streamer having the forward end thereof fitted with a packing box 45 of generally cylindrical configuration composed preferably of aluminum and provided with a plurality of annular grooves 46 formed exteriorly therein for effecting an oiltight seal with the outer tubular member 44 of the streamer section when hose 33 is placed thereover and clamped by the clamp 47 which, like the other hose clamps described and illustrated herein may be of any type suitable for the purpose such, for example, as a type known in the trade as a Punch-Lock clamp.

The packing box 45 comprises a tubular sleeve 48, FIGS. 2 and 3, having a plurality of annular grooves 49 formed therein to receive and retain a pair of keeper rings 51 of the spring lock type respectively disposed therein. Abutting each keeper ring respectively are a pair of phenolic spacer elements 52–53 adapted to compress a phenolic seal 54 composed of material such, for example, as neoprene sufficiently to force the seal into sealing engagement with the inner cylindrical surface of sleeve 48 and to seal the signal conductors 42 and strain cables 55 within the packing box. Each of the spacer elements 52–53 and the seal member 54 is provided with suitable apertures through which the signal conductors and metallic strain cables 55 extend.

A tubular bolt 56 having a locking member 57 configured to seize the head thereof, and preferably doweled to the spacer element 53, is assembled between the head of the bolt and the spacer element to prevent rotation of the bolt as nut 58 is tightened. A washer 59 is preferably assembled between nut 58 and the front spacer element 52. Tightening nut 58 compresses neoprene seal 54 into fluid tight engagement with the bolt in addition to effecting a sealing connection with the strain cables and conductors.

Prior to use in service the streamer section is filled with oil by attaching an oil fitting to the hollow bolt 56. When the streamer is filled with oil a steel ball 62 is placed on a tapered seat 63 formed within the bolt. Cap nut 64 is now threaded on the bolt and tightened sufficiently to draw the ball into firm sealing engagement with the seat and thereby seal the oil within the dead section of the streamer.

The opposite end of the streamer is provided with a similar packing box constructed and arranged to seal the trailing end of the streamer section and the signal wires and strain cables 65 extending therethrough. If desired a solid bolt may be employed to clamp the parts together in lieu of the hollow bolt 56 whereby the dead section of the streamer is invariably filled from the forward end. The groups of metallic strain cables 55 and 65 are provided with clevis type connectors 39 at the ends thereof and are of a length just sufficient to extend in both directions through their respective packing boxes and to facilitate a connection with the strain cables secured thereto.

The inner ends of the strain cables 55 and 65 are connected by strain cables 66 composed preferably of nylon and extending substantially throughout the length of the dead section streamer, the connections being established preferably by splicing the ends of the nylon cables in a manner to form a loop encircling a pin or bolt 67 passing through the aligned apertures in the clevis member 39 substantially as shown. These nylon strain cables possess the desirable quality of absorbing and attenuating mechanical vibrations imparted to the leading end thereof by the lead-in tow cable in such manner that the seismic sensors disposed within the detection streamer are not adversely affected thereby while the streamer is being towed at a uniformly high rate of speed through the water when seismic signals are received thereby.

A plurality of spacers 68 composed preferably of plastic such, for example, as Lucite, are arranged at intervals along the dead section streamer, each spacer having three equally spaced apertures extending longitudinally therethrough within which the strain cables 66 are respectively disposed and a central aperture encircling the signal conductors 42. A plurality of stop members 69 composed preferably of copper and to which a tin finish has been applied are carried by the strain cables 66 on opposite sides of each of the spacers 68 as best shown on FIG. 6, the stop members being compressed inwardly against the cable at a central portion thereof sufficiently to prevent axial movement along the strain cables and retain the floats in predetermined spaced positions therealong. The stops may, if desired, be additionally compressed to form an inwardly projecting dimple as shown to increase the resistance to movement thereof along the strain cable.

The signal conductors 42 are loosely contained within the dead section streamer and exceed the length of the streamer by approximately thirty percent. Thus a dead section streamer having a length of 100 feet, for example, would carry signal wires each having a length of about 130 feet. A convenient manner of distributing this additional length of signal conductor wires along the streamer will best be understood by reference to FIG. 8 which illustrates a relatively short length of conductor wires folded back upon itself and retained by elastic rubber bands 71. These folded signal wires are repeated at intervals between a respective pair of adjacent spacers 68 during the assembly of the dead section. After the section has been filled with oil, the rubber bands are dissolved or rotted by the action of the oil sufficiently to release the folds and permit the wires to assume a loose relaxed position within the dead section streamer.

When the strain cables 65 have been connected to the corresponding strain cables at the head end of the detection streamer and the multiconductor plug 72 has been inserted into the complementary multicontact jack extending from the detection streamer, a short length of hose 73 clamped to the front end portion of the detection streamer section is placed over the trailing end portion of tubing 44 of the dead section and clamped thereto as by clamp 74 illustrated. When this has been done, a thin oil tube having a flattened end portion is inserted beneath the short hose 73 at an end portion thereof and the hose 73 is filled with oil, after which the oil tube is withdrawn and the clamp tightened.

Although the invention has been described with particular reference to a detection streamer having a plurality of pressure responsive detecting devices therein it is also suitable for other types of detecting streamers, employing hydrophones responsive to other characteristics of the reflected seismic acoustic wave such as particle acceleration or velocity, for example.

Whereas the invention has been described with particular reference to a preferred embodiment thereof which gives satisfactory results, it will be understood by those skilled in the art to which the invention pertains, after understanding the invention, that various changes and modifications may be made and various instrumentalities may be employed without departing from the spirit and scope of the invention and it is my intention, therefore, in the appended claims to cover all such changes, modifications and instrumentalities.

What I claim as new and desire to secure by Letters Patent of the United States is:

1. A waterborne seismic prospecting system for subaqueous geological structures comprising, in combination,
   (1) an oil filled flexible elongated neutrally buoyant detector streamer adapted to be towed by a vessel at a uniformly high rate of speed beneath the surface of a body of water and having a plurality of seismic detecting devices therein,
   (2) a lead-in tow cable secured to a vessel for towing the streamer through the water,
   (3) and longitudinally extensible elastic yieldable means interconnecting the trailing end of said tow cable with the leading end of said detection streamer for preventing vibrations of the tow cable from adversely affecting said detecting devices while the streamer is towed through the water at a uniform high rate of speed,
   (4) said yieldable means comprising an elastic oil filled dead section streamer having a plurality of plastic strain cables composed of nylon extending substantially throughout the length thereof,
   (5) and means connecting the ends of said plastic cable to said tow cable and to said detection streamer respectively for applying a towing force to the detection streamer.

2. A seismic prospecting system according to claim 1 in which,
   (1) said lead-in tow cable is provided with means connected at the trailing end thereof for maintaining the trailing end continuously submerged at a predetermined depth of submersion while the streamer is towed through the water.

3. A seismic prospecting system according to claim 2 in which the means for maintaining the trailing end of the tow cable submerged at a predetermined depth comprises,
   (1) a heavy depressor secured to the trailing end of the tow cable,
   (2) a float towed by the vessel in a position substantially directly above said depressor,
   (3) and a length of line interconnecting the depressor with said float just sufficient to maintain the trailing end of the tow cable continuously at said predetermined depth while the streamer is being towed through the water.

4. A waterborne seismic prospecting system for subaqueous geological structures comprising, in combination,
   (1) an oil filled flexible elongated neutrally buoyant detection streamer adapted to be towed by a vessel at a uniformly high rate of speed beneath the surface of a body of water and having a plurality of seismic detecting devices therein,
   (2) a lead-in tow cable secured to the vessel for towing the streamer through the water,
   (3) elastic yieldable means interconnecting the trailing end of said tow cable with the leading end of said detection streamer for preventing vibrations of the tow cable from adversely affecting said detecting devices while the streamer is towed through the water at a uniform high rate of speed, (4) said yieldable means comprising an elastic oil filled dead section streamer having a plurality of plastic strain cables composed of nylon extending substantially throughout the length thereof, (5) means connecting the ends of said plastic cables to said tow cable and to said detection streamer respectively for applying a towing force to the detection streamer, (6) and the dead section streamer includes
  (a) a pair of packing members sealed within the end portions of the streamer respectively,
  (b) and a plurality of relatively short lengths of metallic strain cables connected at the ends of said plastic strain cables and to said tow cable and detection streamer respectively, said metallic strain cables extending through said packing members in oil tight sealed relation therewith.

5. An elastic dead section oil filled streamer for use with a waterborne seismic surveying system comprising an elongated flexible detection streamer having a plurality of seismic detecting devices therein and a towing cable therefor having a plurality of signal conductors therein adapted to be towed continuously at a high rate of speed by a moving vessel, comprising:

(1) an elongated flexible tubular casing having a copious quantity of oil sealed therein, (2) a pair of plug members sealing the opposite ends of said casing, (3) a plurality of relatively short lengths of metallic strain cables extending through each of said plug members in oil tight sealed relation therewith and provided with means at the outer ends thereof for effecting a connection with the towing cable and said detection streamer for applying a towing force thereto, (4) a plurality of equally spaced plastic strain cables having the characteristics of nylon disposed in mutually spaced equidistant relation within said casing throughout substantially the length thereof and respectively connected to the inner ends of said short lengths of metallic strain cables, (5) a plurality of spacer members arranged in predetermined positions at regular intervals within said casing and each provided with equally spaced apertures through which the plastic strain cables are disposed and an additional central aperture, (6) each of said plastic strain cables having a plurality of stop members secured thereto in a manner to prevent axial movement of the spacer members from the predetermined positions, (7) and a plurality of signal conductors disposed within the central aperture of each of said spacer members and extending through said plug members in sealed relation therewith, said signal conductors having means on the ends thereof for establishing a plurality of electrical connections from the detection streamer to the conductors within the towing cable.

6. An elastic dead section streamer according to claim 5 which includes, (1) a plurality of initially folded lengths of flexible signal conductors disposed at intervals within the dead section streamer in a manner to provide substantially thirty percent additional effective length to the signal conductors between said plug members when the folded lengths are unfolded, (2) and a plurality of rubber bands snugly encircling said conductors in a manner to maintain the lengths thereof folded until the bands are softened sufficiently by said oil to effect a release thereof.

7. A mechanical oil filled vibration attenuator for an underwater seismic prospecting system having an elongated detection streamer and a towing cable therefor connected to a vessel and having a plurality of signal conductors therein comprising, (1) a longitudinally extensible elastic dead section streamer having the ends thereof connected to the detection streamer and said towing cable respectively, (2) and a plurality of equally spaced plastic strain cable having the characteristics of nylon extending through substantially the length of said dead section streamer and connectible at the ends thereof to the detection streamer and towing cable respectively for applying a towing force to the streamer and for attenuating vibrations applied to the head end of the dead section streamer by the towing cable sufficiently to prevent impairment of the operation of the detecting devices within the detection streamer while the streamer is towed through the water at a high rate of speed.

8. A vibration attenuator according to claim 7 in which the dead section streamer includes, (1) a plurality of spacer members disposed at intervals within the dead section streamer sufficient to impart a neutral buoyancy thereto and each having a plurality of equally spaced apertures within which said plastic strain cables are respectively arranged and an additional central aperture, (2) and a plurality of signal conductors arranged loosely within the central aperture of each of said spacer members and provided at the ends thereof with means for establishing a plurality of pairs of electrical connections between the detecting devices within the detection streamer and the signal conductors within said towing cable.

9. A seismic prospecting system according to claim 4 which includes (1) a plurality of signal conductors loosely arranged longitudinally within said dead section streamer and extending outwardly through said pair of packing members in oil tight sealed relation therewith, (2) and a plurality of spacer members disposed interiorly at predetermined intervals throughout the length of the dead section streamer, each having apertures therein respectively supporting said plastic strain cables and an additional central aperture through which said signal conductors are loosely disposed.

References Cited by the Examiner

UNITED STATES PATENTS

| | | | |
|---|---|---|---|
| 793,896 | 7/1905 | Mundy | 340—7 |
| 2,465,696 | 3/1949 | Paslay | 181—.5 |
| 3,290,645 | 12/1966 | Pavey et al. | 181—.5 |

BENJAMIN A. BORCHELT, *Primary Examiner.*

SAMUEL FEINBERG, *Examiner.*

W. KUJAWA, *Assistant Examiner.*